(12) United States Patent
Malik

(10) Patent No.: US 11,734,497 B2
(45) Date of Patent: Aug. 22, 2023

(54) DOCUMENT AUTHORING PLATFORM

(71) Applicant: Icarus Lived Inc., New York, NY (US)

(72) Inventor: John Irfan Malik, New York, NY (US)

(73) Assignee: Icarus Lived Inc., New York, NY (US)

( * ) Notice: Subject to any disclaimer, the term of this patent is extended or adjusted under 35 U.S.C. 154(b) by 0 days.

(21) Appl. No.: 16/876,534

(22) Filed: May 18, 2020

(65) Prior Publication Data

US 2021/0357576 A1 Nov. 18, 2021

(51) Int. Cl.
| | |
|---|---|
| *G06F 40/143* | (2020.01) |
| *G06F 16/2457* | (2019.01) |
| *G06F 40/186* | (2020.01) |
| *G06F 16/25* | (2019.01) |

(52) U.S. Cl.
CPC ...... *G06F 40/143* (2020.01); *G06F 16/24573* (2019.01); *G06F 40/186* (2020.01); *G06F 16/252* (2019.01)

(58) Field of Classification Search
CPC ............. G06F 40/143; G06F 40/186; G06F 16/24573; G06F 16/252
USPC ........................................................ 715/234
See application file for complete search history.

(56) References Cited

U.S. PATENT DOCUMENTS

| | | | | |
|---|---|---|---|---|
| 10,733,370 | B2* | 8/2020 | Owens | G06F 40/106 |
| 2007/0055926 | A1* | 3/2007 | Christiansen | G06Q 10/10 |
| | | | | 715/210 |
| 2007/0083851 | A1* | 4/2007 | Huang | G11B 27/034 |
| | | | | 717/113 |
| 2010/0119053 | A1* | 5/2010 | Goeldi | G06Q 30/0251 |
| | | | | 379/265.09 |
| 2010/0185934 | A1* | 7/2010 | Fortuna | G06F 16/951 |
| | | | | 715/234 |
| 2010/0287188 | A1* | 11/2010 | Kakar | G06Q 10/06 |
| | | | | 707/769 |
| 2011/0202606 | A1* | 8/2011 | Agarwal | H04L 51/212 |
| | | | | 709/206 |
| 2012/0173969 | A1* | 7/2012 | Schmid | G06F 40/186 |
| | | | | 715/246 |
| 2012/0254719 | A1* | 10/2012 | Hackmann | G06F 40/157 |
| | | | | 715/234 |

(Continued)

OTHER PUBLICATIONS

Garsiel et al., How Browsers Work: Behind the scenes of modern web browsers; Aug. 5, 2011; HTML5 Rocks; 52 pages.*

(Continued)

*Primary Examiner* — Andrew R Dyer
(74) *Attorney, Agent, or Firm* — Schwegman Lundberg & Woessner, P.A.

(57) ABSTRACT

A document authoring platform receives a user-selected idea type attribute of a structured document template. The platform identifies a supporting idea type attribute based on the user-selected idea type attribute and taxonomy rules for the structured document template. The platform receives a user-selected supporting idea type attribute and content of the user-selected supporting idea type attribute. The platform forms a tree structure of the structured document template based on the user-selected idea type attribute, the user-selected supporting idea type attribute, and the content of the user-selected supporting idea type attribute. A document is generated based on the tree structure.

16 Claims, 18 Drawing Sheets

(56) References Cited

U.S. PATENT DOCUMENTS

| | | | | |
|---|---|---|---|---|
| 2013/0080266 | A1* | 3/2013 | Molyneux | G06Q 10/00 |
| | | | | 705/14.72 |
| 2014/0229230 | A1* | 8/2014 | Lynn | G06Q 30/0201 |
| | | | | 705/7.29 |
| 2014/0358518 | A1* | 12/2014 | Wu | G06F 40/47 |
| | | | | 704/3 |
| 2016/0110766 | A1* | 4/2016 | Katti | G06Q 30/0256 |
| | | | | 705/14.54 |
| 2017/0052943 | A1* | 2/2017 | Owens | G06F 40/106 |
| 2017/0126592 | A1* | 5/2017 | El Ghoul | H04L 51/24 |
| 2017/0295126 | A1* | 10/2017 | Novick | H04L 51/32 |
| 2018/0089155 | A1* | 3/2018 | Baron | G06F 40/194 |
| 2018/0267950 | A1* | 9/2018 | de Mello Brandao | |
| | | | | G06F 3/0481 |
| 2019/0095504 | A1* | 3/2019 | Stout | G06Q 30/0282 |
| 2019/0147062 | A1* | 5/2019 | Kim | G06F 16/248 |
| | | | | 707/748 |
| 2019/0340230 | A1* | 11/2019 | Gall | G06F 40/197 |
| 2020/0133962 | A1* | 4/2020 | Kuo | G06F 40/154 |
| 2020/0257850 | A1* | 8/2020 | Carbune | G06F 40/20 |

OTHER PUBLICATIONS

Colligan et al.; Special Edition Using Microsoft Office FrontPage 2003; 2004; Que Publishing; pp. 50-64.*
"Social network;" Jul. 9, 2018; Dictionary.com; p. 1.*

* cited by examiner

DOCUMENT AUTHORING PLATFORM

TECHNICAL FIELD

The subject matter disclosed herein generally relates to a special-purpose machine that provides a platform for authoring a document, including computerized variants of such special-purpose machines and improvements to such variants. Specifically, the present disclosure addresses systems and methods that provide a web-based application for authoring an online document using a logical tree structure and taxonomy rules.

BACKGROUND

Productivity applications can include tools for producing content, such as creating and editing content within different types of documents such as word processing documents, spreadsheets, and presentations. In some cases, productivity applications include content authoring applications.

While creating and editing content within a content authoring application, a user may start with a blank page. The user may also find it difficult to identify references and sources that support ideas expressed in a newly authored document. Structuring the document in a logical pattern and finding relevant information from online sources can be a challenge.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates a screenshot of an authoring platform system in accordance with one example embodiment.

FIG. 11 illustrates a screenshot of an authoring platform system in accordance with one example embodiment.

FIG. 15 illustrates a screenshot of an authoring platform system in accordance with one example embodiment.

DETAILED DESCRIPTION

Figure 1:
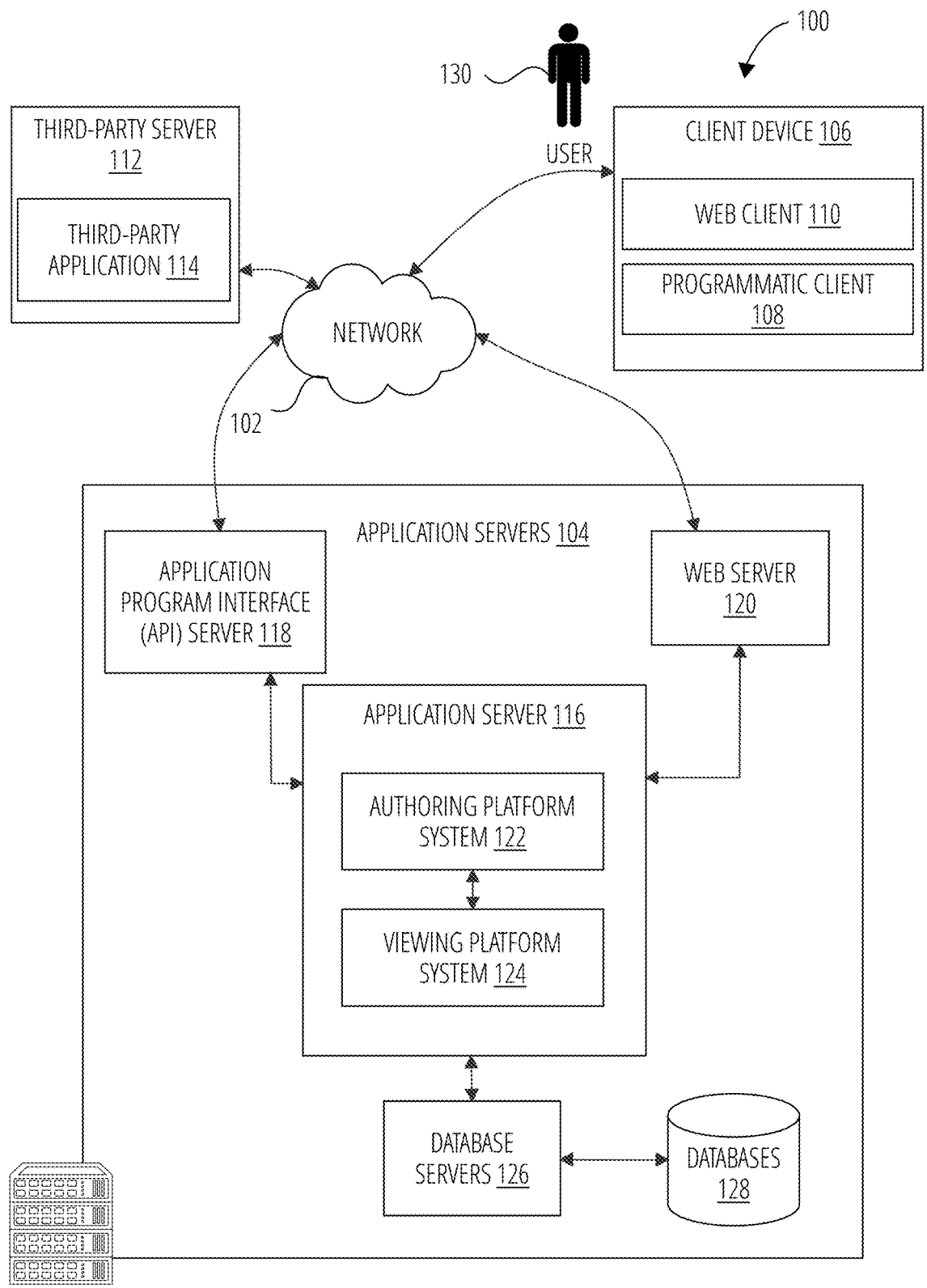
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The presently described document authoring platform enables a user to author content such as ideas and supporting content using taxonomy rules for the types of ideas and rules for supporting content. In one example, the platform provides a process flow that enables the user to provide the idea content and supporting content using a structured template in a web-based application. The structured template validates the idea content and supporting content based on the taxonomy and content rules.

In one example embodiment, the document authoring platform generates a graphical user interface that includes a chart view illustrating a tree structure of the document, a reader view illustrating a published version of the document, and an authoring view illustrating the structured template of the document. In another example embodiment, the graphical user interface illustrates a WYSIWYG ("what you see is what you get") type of user interface. In other words, the graphical user interface allows content to be edited in a form that resembles its appearance when published or displayed as a final version, such as a document, a web page, or a slide presentation.

The document authoring platform generates the tree structure based on the idea content, the types of ideas, and the supporting content. The document authoring platform updates the tree structure based on the values of the attributes of the documents. The authoring view enables the user to enter updated values of the attributes in the structured template of the document. The published version of the document includes the idea content and supporting content without explicitly showing the attributes (e.g., types of ideas, types of supporting content). In another example, the published version of the document includes the idea content and supporting content and identifies one or more of the attributes.

In another example embodiment, the structured template also enables the user to search for existing supporting content related to the idea content. The document authoring platform can incorporate the existing supporting content into a body of a current document. As such, the user can leverage and expand upon existing supporting content.

In one example embodiment, a document authoring platform receives a user-selected idea type attribute of a structured document template. The platform identifies a supporting idea type attribute based on the user-selected idea type attribute and taxonomy rules for the structured document template. The platform receives a user-selected supporting idea type attribute and content of the user-selected supporting idea type attribute. The platform forms a tree structure of the structured document template based on the user-selected idea type attribute, the user-selected supporting idea type attribute, and the content of the user-selected supporting idea type attribute. A document is generated based on the tree structure.

As a result, one or more of the methodologies described herein facilitate solving the technical problem of generating a logically structured and rule-validated document. As such, one or more of the methodologies described herein may obviate a need for certain efforts or computing resources that otherwise would be involved in running limited and simple tools such as spelling and grammar check. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 106. A web client 110 (e.g., a browser) and/or a programmatic client 108 (e.g., an "app") are hosted and execute on the client device 106.

An Application Program Interface (API) server 118 and a web server 120 provide respective programmatic and web interfaces to application servers 104. A specific application server 116 hosts an authoring platform system 122 and a viewing platform system 124, each including components, modules and/or applications.

The authoring platform system 122 comprises an application that enables a user 130 of the client device 106 to author and edit content in a document using a structured template. The document can be published, stored at application servers 104, and shared with other users. In one example embodiment, the authoring platform system 122 includes a web-based application hosted on the application server 116 and accessible by the web client 110 via the web server 120. In another example, the authoring platform system 122 includes a server-based application hosted on the application server 116 and accessible by the web client 110 via the Application Program Interface (API) server 118. The authoring platform system 122 receives content for the structured template from the client device 106. In one example embodiment, the authoring platform system 122 provides a choice of several types of content (e.g., idea types) and receives a selection of a type of content from the client device 106. The authoring platform system 122 further receives content related to the selection of the type of content and validates the received content against taxonomy rules and content rules stored at the application server 116.

The authoring platform system 122 generates a tree structure based on the content and selected types of content. The authoring platform system 122 uses the tree structure to generate a document for publication and sharing. An example embodiment of the authoring platform system 122 is described further below with respect to FIG. 2.

The viewing platform system 124 enables the user 130 to view and read documents published using the authoring platform system 122. The published document includes ideas and supporting content organized in a logical structure based on the tree structure.

The web client 110 communicates with the authoring platform system 122 and the viewing platform system 124 via the web interface supported by the web server 120. Similarly, the programmatic client 108 communicates with the authoring platform system 122 and viewing platform system 124 via the programmatic interface provided by the Application Program Interface (API) server 118. The third-party application 114 may include, for example, a social network application, a document collaboration application, or any other software platform that enable sharing of information and documents between users.

The application server 116 is shown to be communicatively coupled to database servers 126 that facilitates access to an information storage repository or databases 128. In an example embodiment, the databases 128 includes storage devices that store documents to be published and/or processed by the authoring platform system 122 and the viewing platform system 124.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 18, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
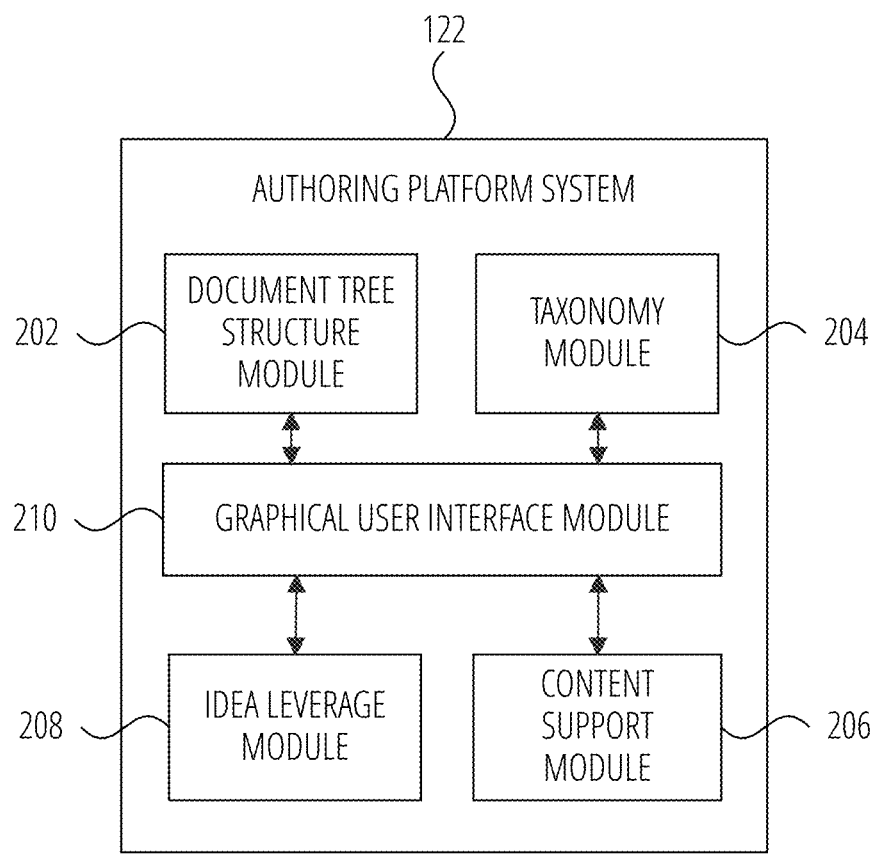
FIG. 2 illustrates an authoring platform system in accordance with one example embodiment.

FIG. 2 illustrates an authoring platform system 122 in accordance with one example embodiment. The authoring platform system 122 comprises a document tree structure module 202, a taxonomy module 204, a content support module 206, an idea leverage module 208, and a graphical user interface module 210.

The document tree structure module 202 generates a structured document template that allows the user 130 to input data. The structure document template comprises, for example, a title, an idea, an idea type (e.g., opinion, principle, fact, meaning, personal experience, hypothetical example), a supporting idea type (e.g., opinion, principle, fact, meaning, personal experience, hypothetical example), and content assigned to the selected supporting idea type field. Those of ordinary skills in the art will recognize that the above listed types of ideas or supporting ideas are not limited to the above examples. For example, support can be in the form of (i) a reason, (ii) an example, or (iii) context. The document tree structure module 202 generates a tree structure based on the content of the corresponding selected idea type and the selected supporting idea type attributes. For example, the idea types are for the "nodes", but the support types are the "edges."

In one example, the structured document template comprise fields corresponding to the title, idea, idea types, and supporting idea types. The user 130 inputs content corresponding to fields selected by the user in the structured document template. The fields may be associated with corresponding attributes of the structured document template. In one example process flow, the user 130 first inputs a title in a title field of the structured document template, and then selects an idea type in the structured document template. The structured document template dynamically updates the list of attributes related to the types of supporting ideas based on the selected idea type. The structured document template then presents the updated list of attributes and indicates which attributes are required based on the selected idea type. In another example embodiment, the document tree structure module 202 generates a document for publication based on the content in the selected attributes and fields, and a tree structure of the document.

The taxonomy module 204 uses predefined types of attributes (e.g., idea types) and predefined content rules (e.g., supporting idea rules) to validate content in the structured document template. For example, when the user 130 selects an opinion as an idea type, the structured document template indicates the types of supporting ideas (e.g., opinion and principle) that are required based on the selected opinion idea type. An example embodiment of the taxonomy module 204 is further described below with respect to FIG. 3.

The content support module 206 operates the fields related to the supporting ideas attributes. For example, the fields include user-provided content (e.g., user can type in text to express their opinion/principle), factual content (e.g., user provides a citation to a journal), and keywords related to the user-provided content.

The idea leverage module 208 enables the user 130 to search existing content (of supporting ideas attributes) from other documents previously generated using the authoring platform system 122. As such, the user 130 can leverage and incorporate existing content of supporting ideas attributes into the present document. In one example embodiment, the idea leverage module 208 receives a search query in a supporting idea search field. The idea leverage module 208 provides search results based on the search query. The user 130 selects one of the search results. The idea leverage module 208 adds content from the selected search result into the supporting idea attribute of the present document.

The graphical user interface module 210 generates a graphical user interface that illustrates a combination of the tree structure, a reader view, and an editor view. The tree structure is based on the logical structure and elements of the selected supporting idea attributes and types. Changes to the tree structure result in changes to the generated document. Furthermore, changes to the content using the editor view reflect changes to the tree structure and the generated document. In one example, the graphical user interface module 210 generates a single pane that illustrates the editor view. In another example, the graphical user interface module 210 generates a first pane illustrating the tree structure, a second pane illustrating the reader view, and a third pane illustrate the editor view.

Figure 3:
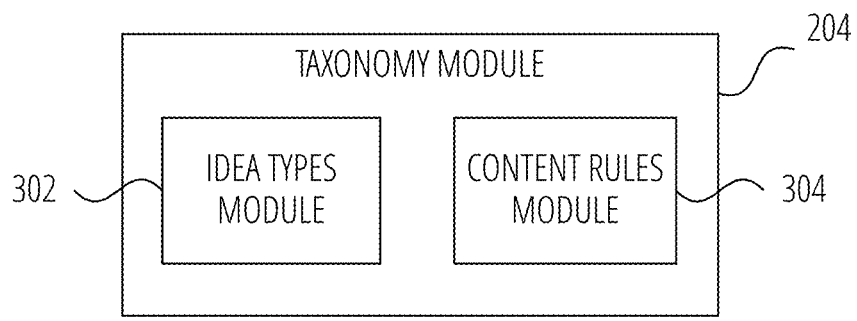
FIG. 3 illustrates a taxonomy module in accordance with one example embodiment.

FIG. 3 illustrates a taxonomy module 204 in accordance with one example embodiment. The taxonomy module 204 comprises an idea types module 302, and a content rules module 304. The idea types module 302 defines the types of ideas available for selection: opinion, principle, fact, meaning, personal experience, hypothetical example. Those of ordinary skills in the art will recognize that the above listed types of ideas are, for illustration purposes, and not limited to the above examples. Other types of ideas or categorization of ideas may be used.

The content rules module 304 defines rules related to content that support the selected types of ideas. For example, the following illustrates an example of content rules logic:
Idea Types:
Opinion
Principle
Fact
Meaning
Personal Experience ("PE")
Hypothetical Example ("HE")
Fundamental Belief Types (also referred to as "fundamental values"):
Belief System
Principle-value
Fact-value
Rules for Saving/Publishing:
To save any work, the required fields must be satisfied.
Example rules for "complete thinking;" if thinking is not complete:
 1. An incomplete thinking indicator is displayed.
 2. The idea should not be "believable" by anyone else.
The content rules module 304 validates selected types of support ideas. In other words, actions that are not permitted are not presented by authoring platform system 122. For example, the authoring platform system 122 does not show the option to add an opinion if it is not permitted as support. The following illustrates examples of rules:
Opinions can only be supported by:
Opinions
Principles
Facts
Meaning
Personal Experiences
Hypothetical Examples
Principles can only be supported:
Principles Facts
Belief systems
Principle-values
Meaning
Personal Experiences
Hypothetical Examples
Facts can only be supported by:
Facts
Belief systems
Fact-values
Meaning
Personal Experiences
Hypothetical Examples
No other idea-types can have support.

Those of ordinary skills in the art will recognize that the content rules module 304 is not limited to the example rules listed above; other rules can be used in the content rules module 304. Furthermore, the present application is not limited to the above terminology. Other terminology of content rules and content types may be used. For example, the term "grounding truth", "conceptual idea", "belief idea/system" may be used to describe "foundational values."

Figure 4:
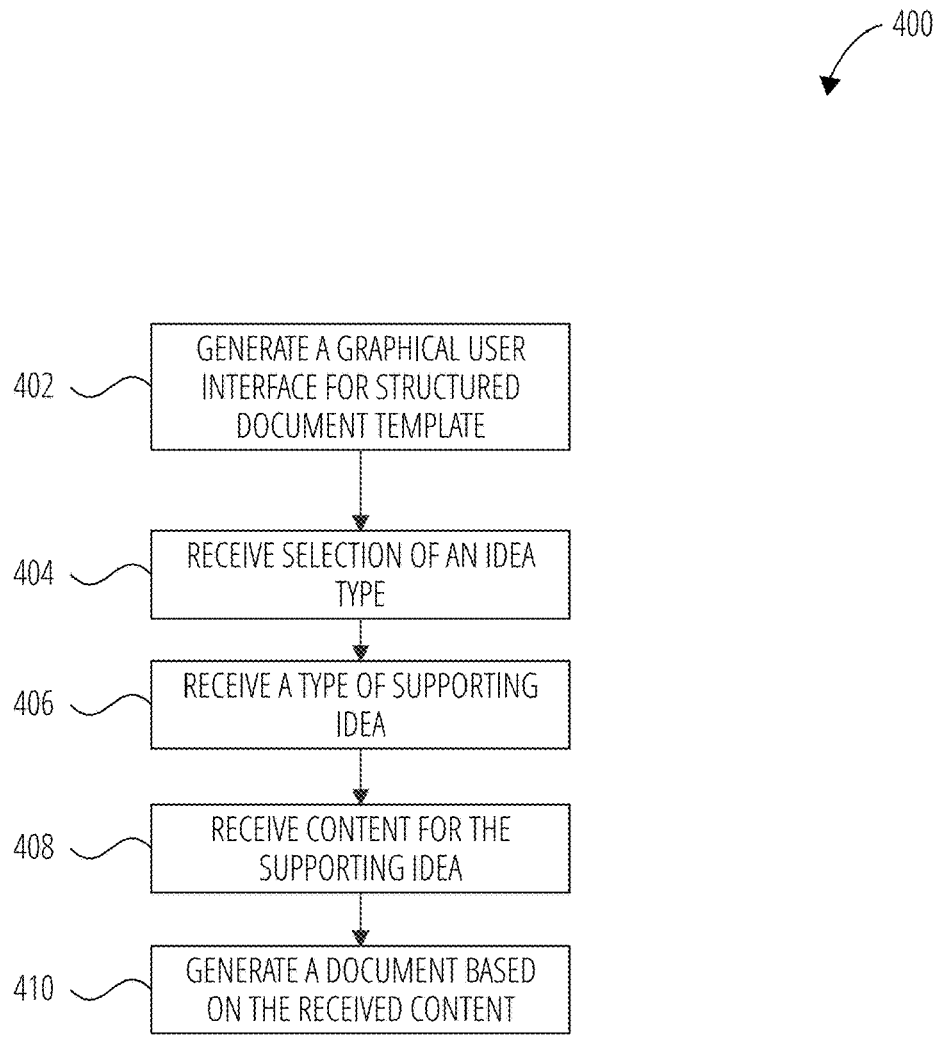
FIG. 4 illustrates a flow diagram of a method for generating a document in accordance with one example embodiment.

FIG. 4 is a flow diagram illustrating a method 400 for generating a document based on a structured document template. The method 400 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 402, the authoring platform system 122 generates a graphical user interface for the structure document template. In one example embodiment, the graphical user interface module 210 can be used to implement the operation of block 402.

At block 404, the authoring platform system 122 receives a selection of an idea type. For example, the user 130 selects an "opinion" as an idea type. In one example embodiment, the document tree structure module 202 can be used to implement the operation of block 404.

At block 406, the authoring platform system 122 receives a type of supporting idea. In one example embodiment, the content support module 206 can be used to implement the operation of block 406.

At block 408, the authoring platform system 122 receives content for the supporting idea. In one example embodiment, the content support module 206 can be used to implement the operation of block 408.

At block 410, the authoring platform system 122 generates a document based on the received content. In one example embodiment, the document tree structure module 202 can be used to implement the operation of block 408.

Figure 5:
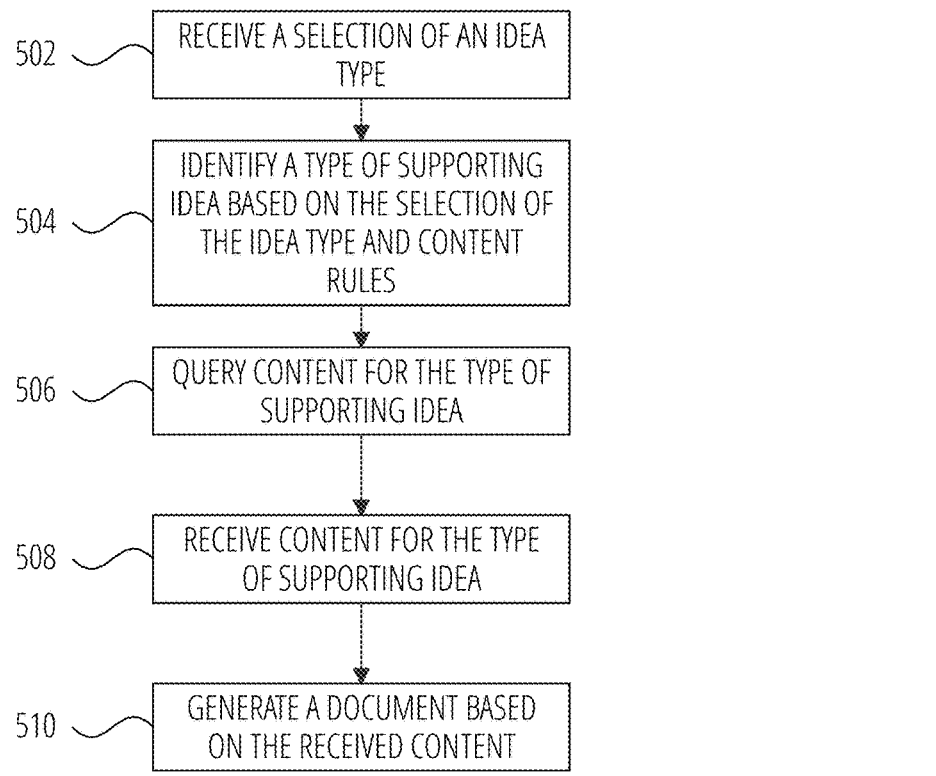
FIG. 5 illustrates a flow diagram of a method for receiving content for a type of supporting idea in accordance with another example embodiment.

FIG. 5 is a flow diagram illustrating a method 500 for generating a document based on content received in a structure document template. The method 500 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 502, the authoring platform system 122 receives a selection of an idea type. In one example embodiment, the document tree structure module 202 can be used to implement the operation of block 502.

At block 504, the authoring platform system 122 identifies a type of supporting idea based on the selection of the idea type and content rules. In one example embodiment, the content support module 206 can be used to implement the operation of block 504.

At block 506, the authoring platform system 122 queries content for the type of supporting idea. In one example embodiment, the content support module 206 can be used to implement the operation of block 506.

At block 508, the authoring platform system 122 receives content for the type of supporting idea. In one example embodiment, the content support module 206 can be used to implement the operation of block 508.

At block 510, the authoring platform system 122 generates a document based on the received content. In one example embodiment, the document tree structure module 202 can be used to implement the operation of block 510.

Figure 6:
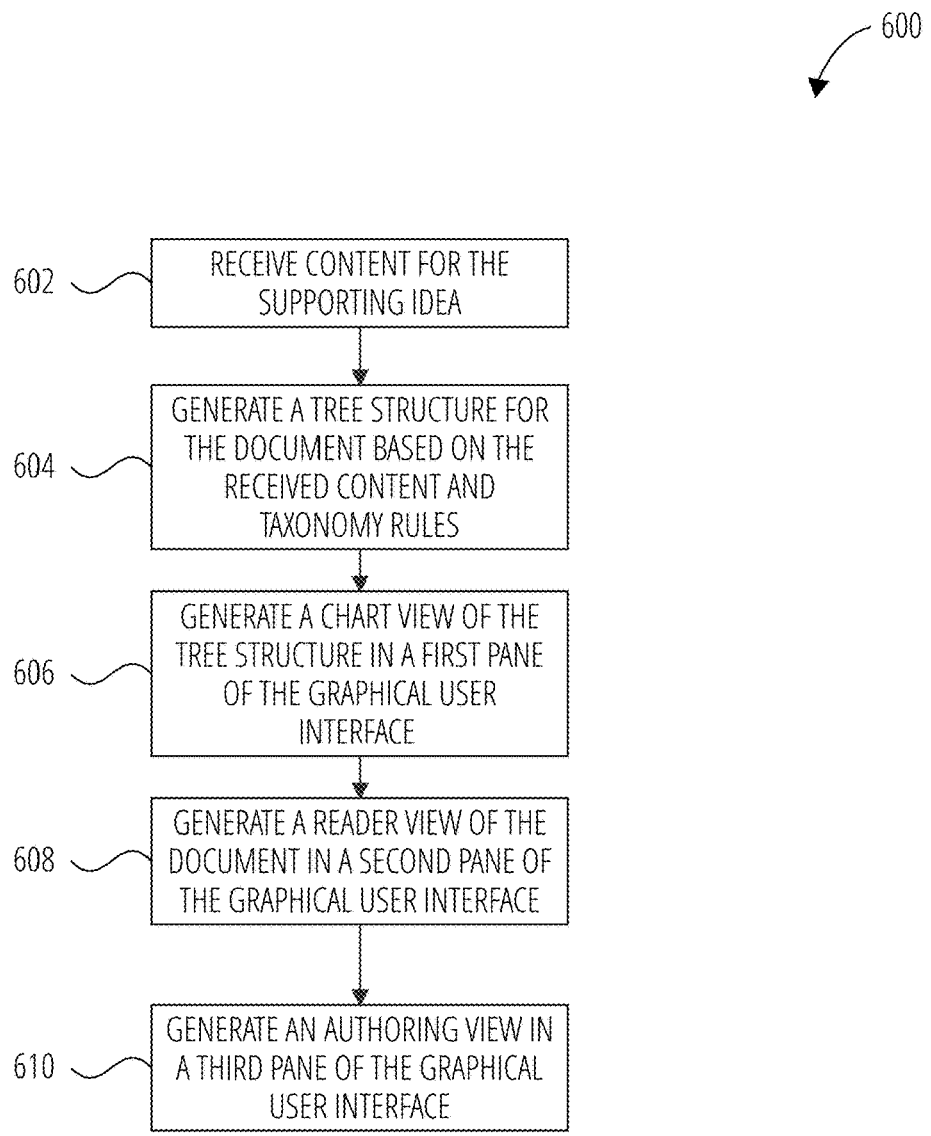
FIG. 6 illustrates a flow diagram of a method for generating a graphical user interface in accordance with one example embodiment.

FIG. 6 is a flow diagram illustrating a method 600 for generating a graphical user interface for a document. The method 600 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 602, the authoring platform system 122 receives content for the supporting idea. In one example embodiment, the graphical user interface module 210 can be used to implement the operation of block 602.

At block 604, the authoring platform system 122 generates a tree structure for the document based on the received content and taxonomy rules. In one example embodiment, the graphical user interface module 210 can be used to implement the operation of block 604.

At block 606, the authoring platform system 122 generates a chart view of the tree structure in a first pane of the graphical user interface. In one example embodiment, the graphical user interface module 210 can be used to implement the operation of block 606.

At block 608, the authoring platform system 122 generates a reader view of the document in a second pane of the graphical user interface. In one example embodiment, the graphical user interface module 210 can be used to implement the operation of block 608.

At block 610, the authoring platform system 122 generates an authoring view in a third pane of the graphical user interface. In one example embodiment, the graphical user interface module 210 can be used to implement the operation of block 610.

Figure 7:
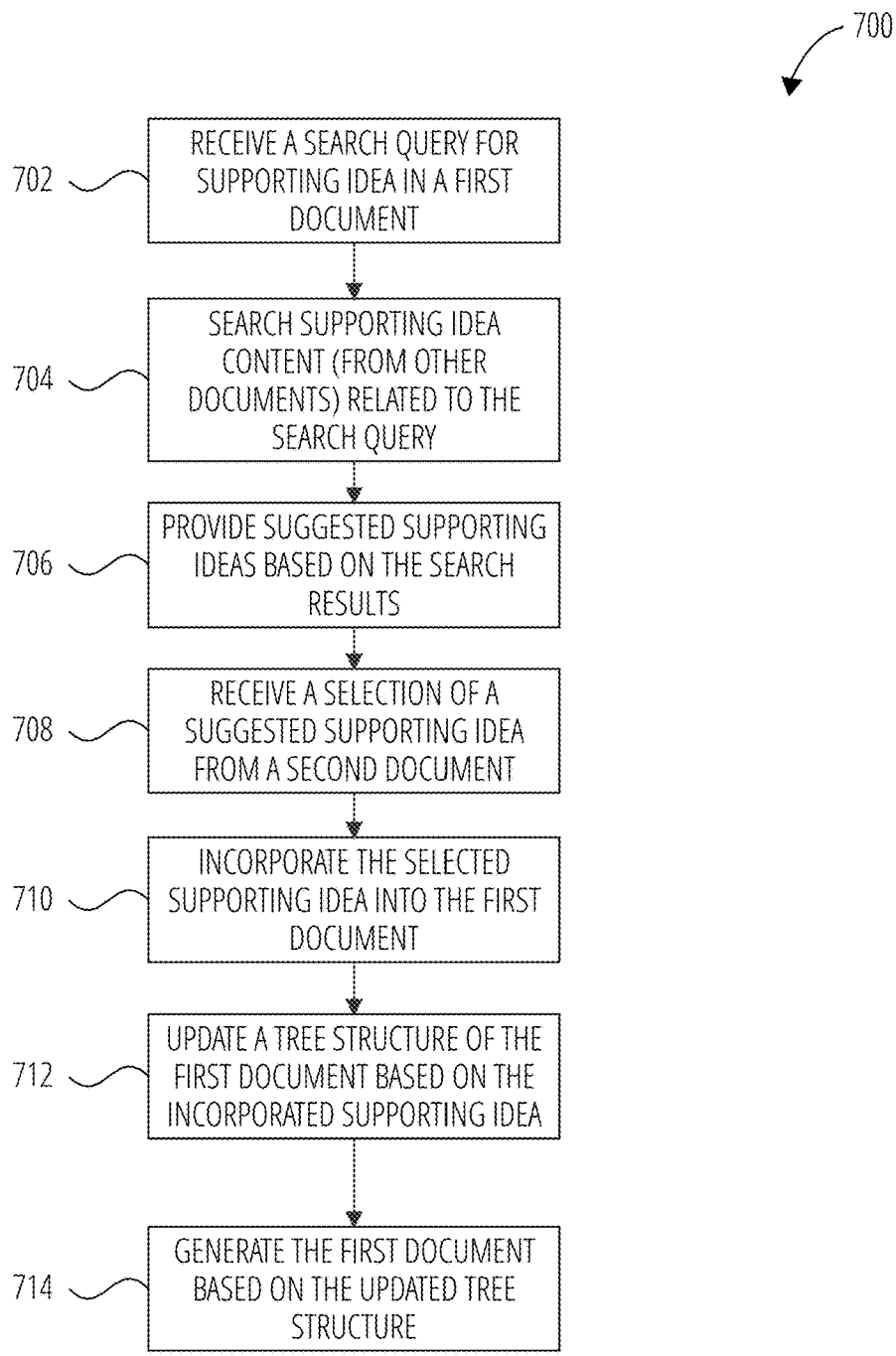
FIG. 7 illustrates a flow diagram of a method for leveraging existing content in accordance with one example embodiment.

FIG. 7 is a flow diagram illustrating a method 700 for leveraging an existing document. The method 700 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 702, the authoring platform system 122 receives a search query for supporting idea in a first document. In one example embodiment, the idea leverage module 208 is used to implement the operation of block 702.

At block 704, the authoring platform system 122 searches supporting idea content from existing documents (previously generated using the document tree structure module 202) related to the search query. In one example embodiment, the idea leverage module 208 is used to implement the operation of block 704.

At block 706, the authoring platform system 122 provides suggested supporting ideas based on the search results. In one example embodiment, the idea leverage module 208 is used to implement the operation of block 706.

At block 708, the authoring platform system 122 receives a selection of a suggested supporting idea form a second document. In one example embodiment, the idea leverage module 208 is used to implement the operation of block 708.

At block 710, the authoring platform system 122 incorporates the selected supporting idea into the first document. In one example embodiment, the idea leverage module 208 is used to implement the operation of block 710.

At block 712, the authoring platform system 122 updates a tree structure of the first document based on the incorporated a tree structure of the first document based on the incorporated supporting idea. In one example embodiment, the idea leverage module 208 is used to implement the operation of block 712.

At block 714, the authoring platform system 122 generates the first document based on the updated tree structure. In one example embodiment, the idea leverage module 208 is used to implement the operation of block 714.

Figure 8:
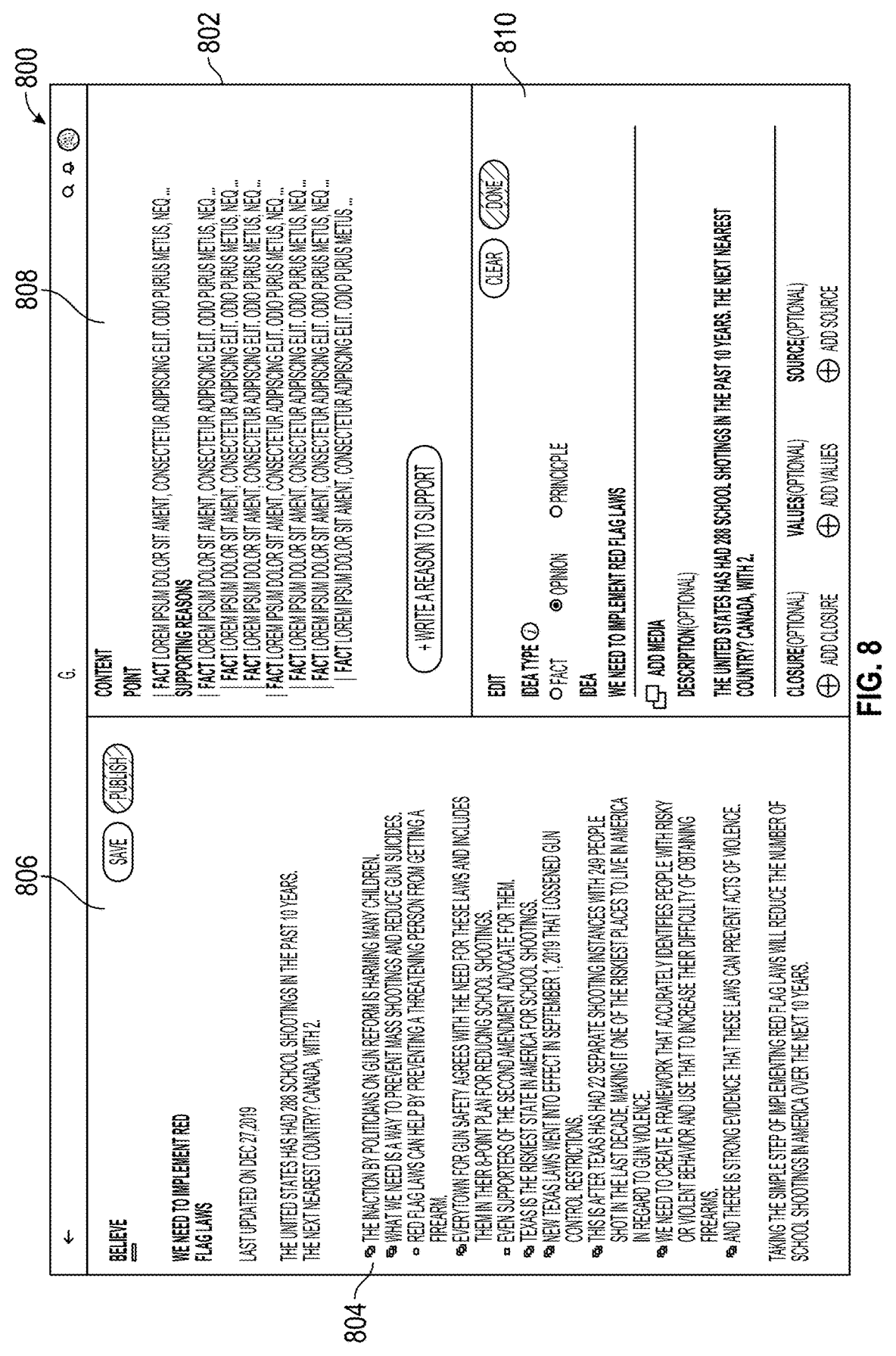

FIG. 8 illustrates a screenshot 800 of the authoring platform system 122 in accordance with one example embodiment. The screenshot 800 illustrates a graphical user interface 802 that has three sections: section 806, section 808, section 810. Section 806 allows the user 130 to edit content in a form that resembles its appearance when the article is published in section 806. The section 806 displays support content 804 that represent branches of the tree structure. Each support content 804 can be further broken down into smaller fundamental components (e.g., fact, source). Section 808 illustrates the tree structure in a bullet point format. The section 810 enables the user 130 to edit metadata of the article.

Figure 9:
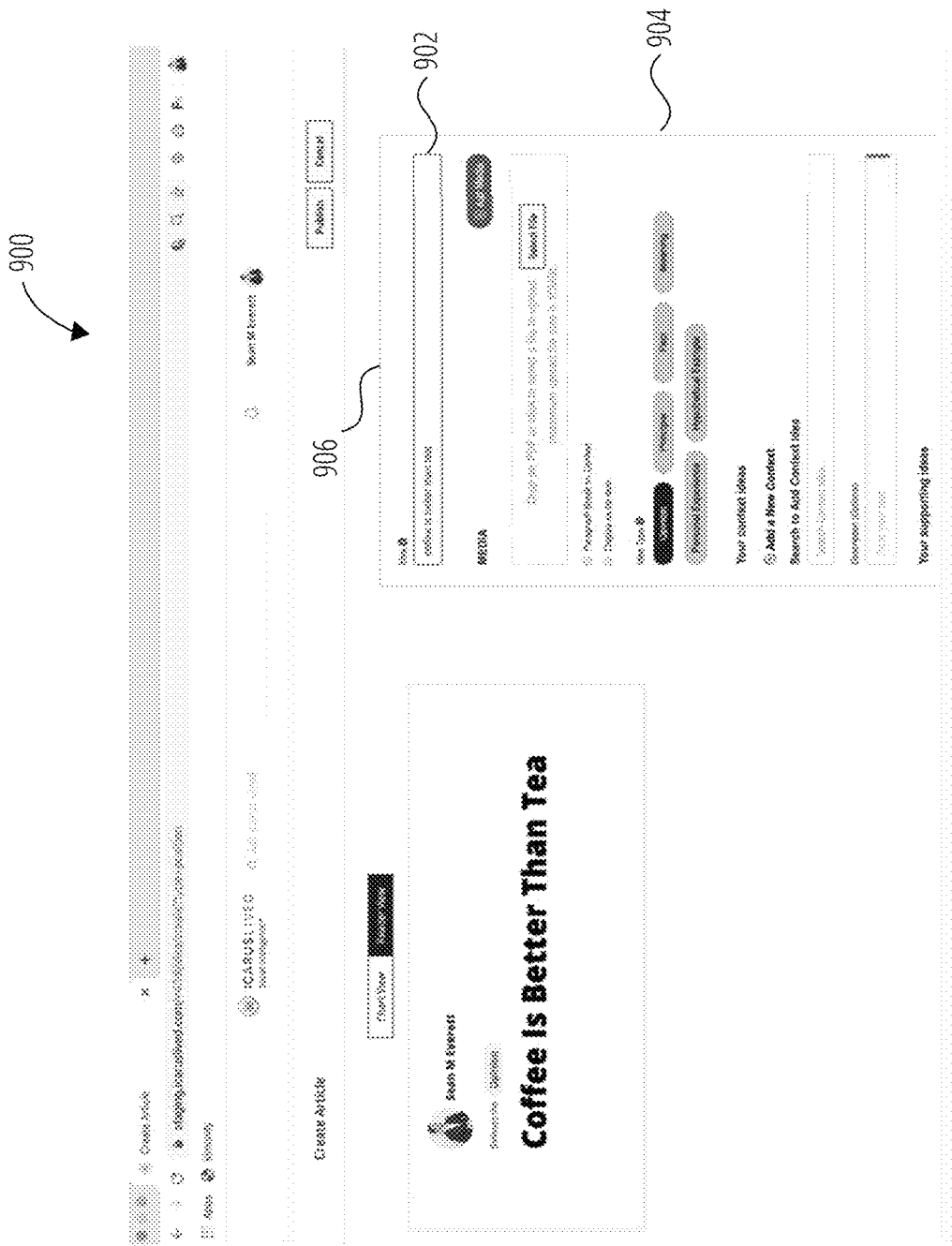
FIG. 9 illustrates a screenshot of an authoring platform system in accordance with one example embodiment.

FIG. 9 illustrates a screenshot 900 of the authoring platform system 122 in accordance with one example embodiment. The screenshot 900 illustrates a structured document template 906. The structured document template 906 includes an idea field 902. The user 130 can enter content in the idea field 902. The user can also select a type of idea in the idea type attributes 904.

Figure 10:
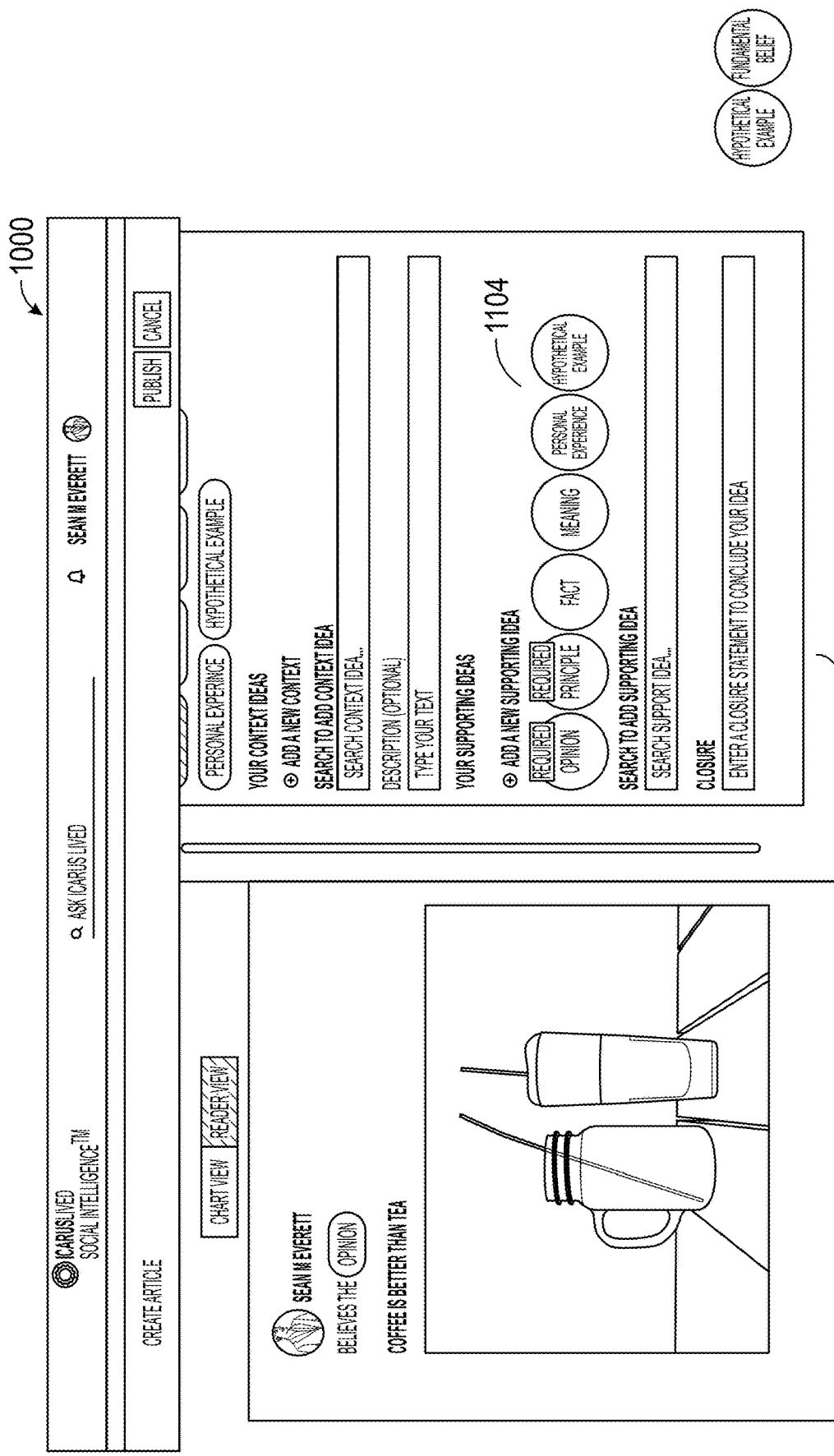
FIG. 10 illustrates a screenshot of an authoring platform system in accordance with one example embodiment.

FIG. 10 illustrates a screenshot 1000 of the authoring platform system 122 in accordance with one example embodiment. The screenshot 1000 illustrates a structured document template 1002. The structured document template 1002 indicates the supporting idea attributes 1004. The user 130 can select the type of supporting idea in the supporting idea attributes 1004.

Figure 11:
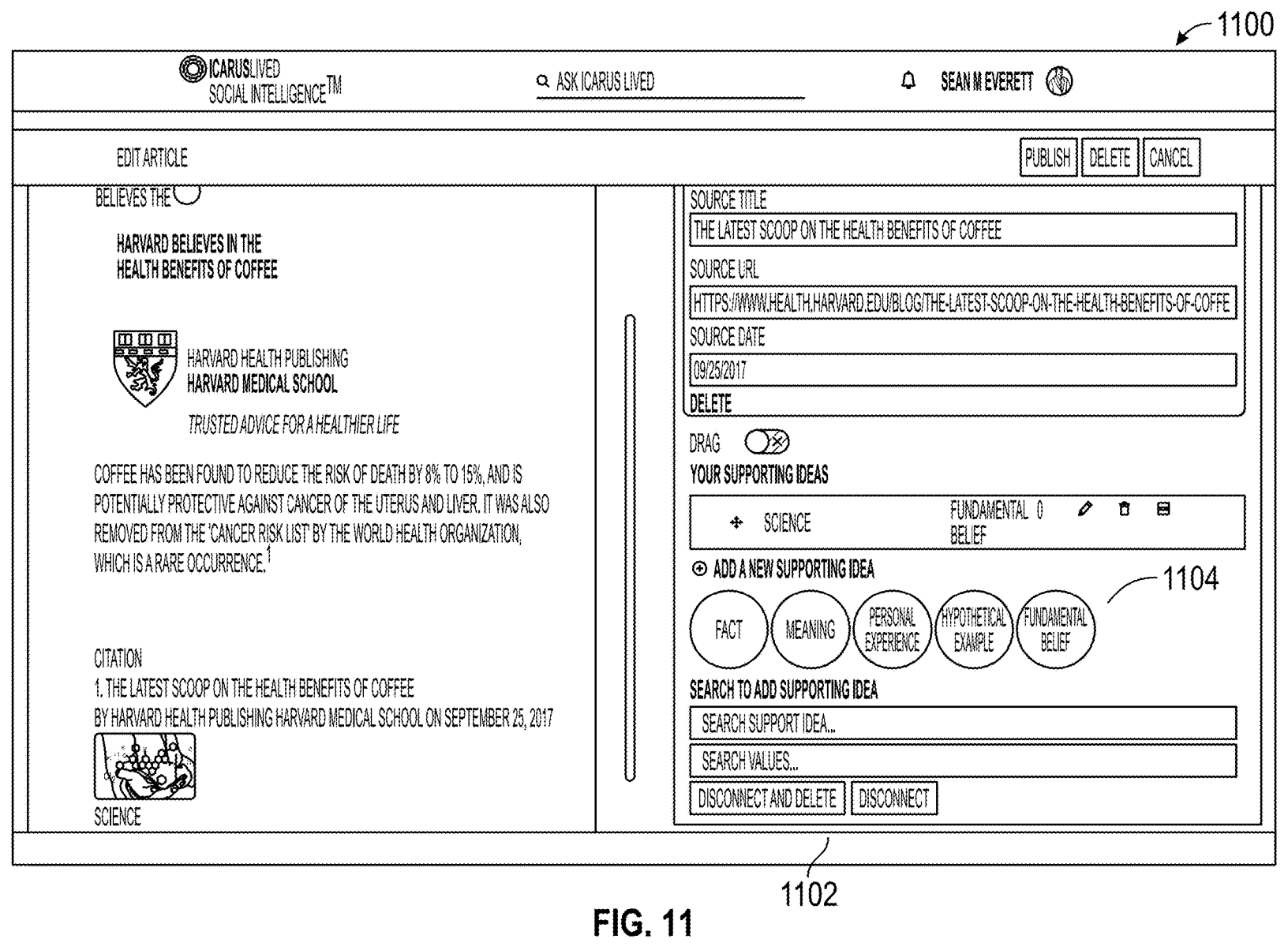

FIG. 11 illustrates a screenshot 1100 of the authoring platform system 122 in accordance with one example embodiment. The screenshot 1100 illustrates a structured document template 1102. The structured document template 1102 indicates the supporting idea attributes 1104 based on the selected idea type. The user 130 can select the type of supporting idea in the supporting idea attributes 1104.

Figure 12:
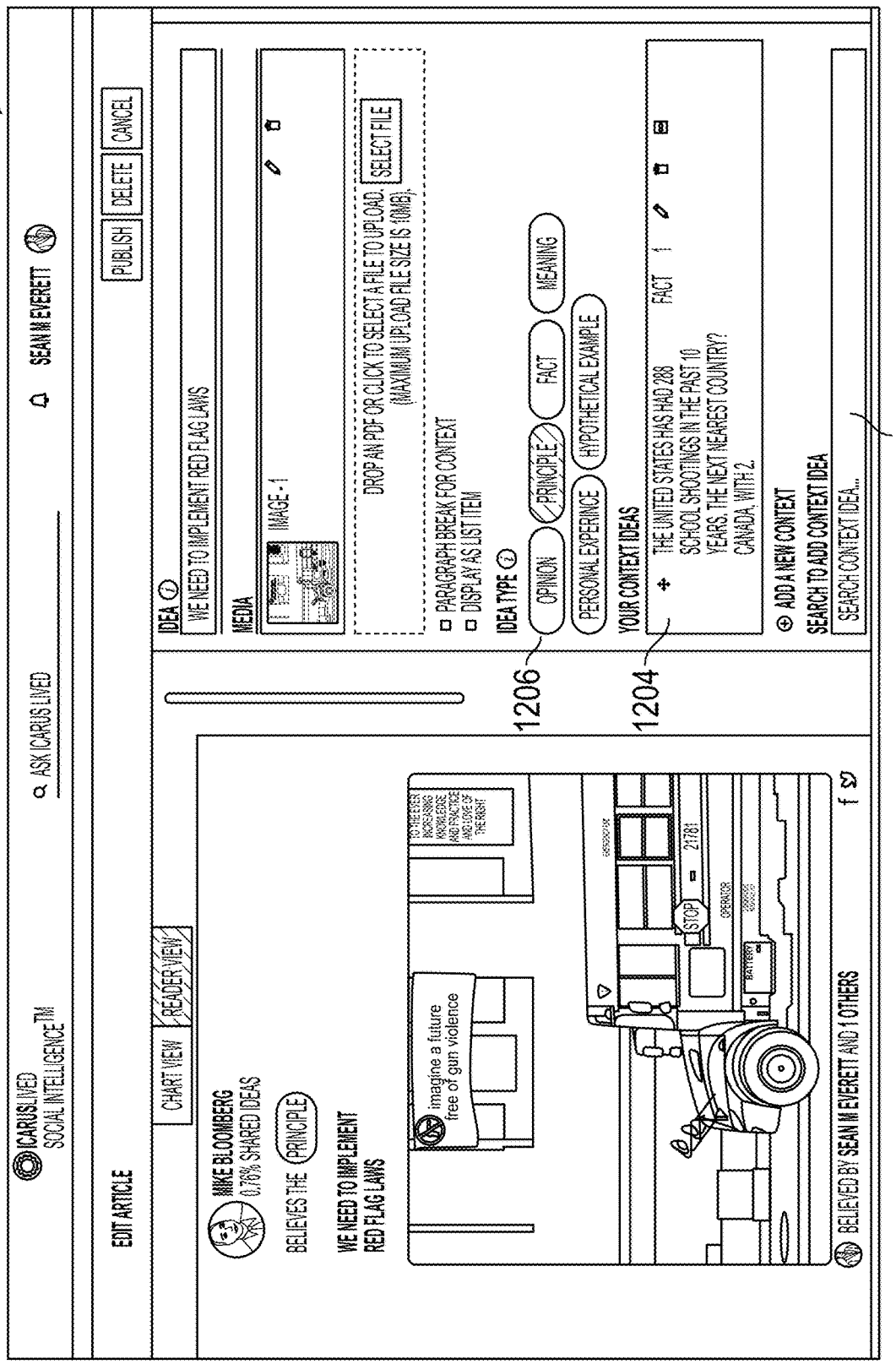
FIG. 12 illustrates a screenshot of an authoring platform system in accordance with one example embodiment.

FIG. 12 illustrates a screenshot 1200 of the authoring platform system 122 in accordance with one example embodiment. The screenshot 1200 illustrates a structured document template 1202. The structured document template 1202 indicates the idea type 1206 and the idea content 1204 corresponding to the selected idea type 1206.

Figure 13:
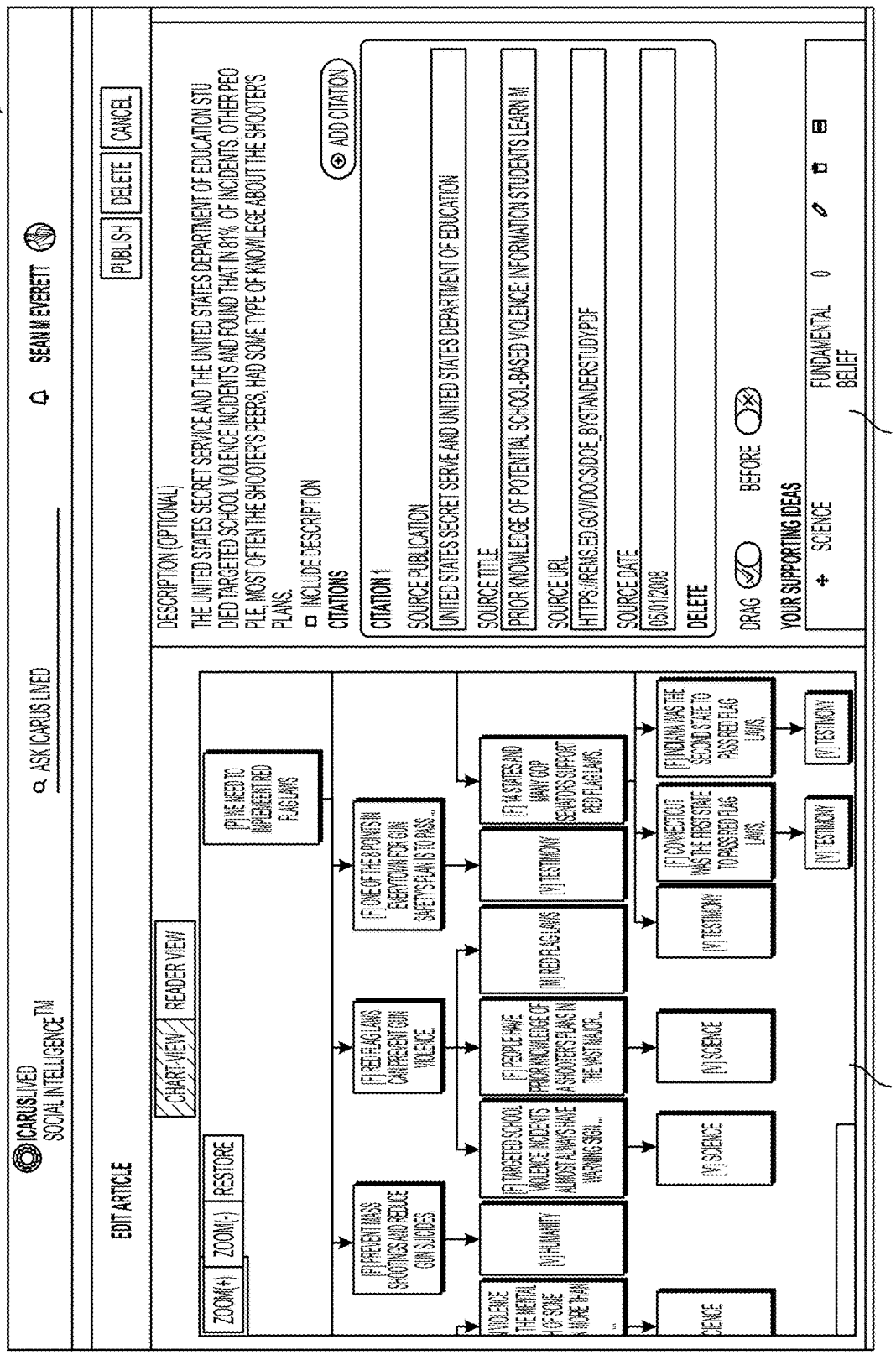
FIG. 13 illustrates a screenshot of an authoring platform system in accordance with one example embodiment.

FIG. 13 illustrates a screenshot 1300 of the authoring platform system 122 in accordance with one example embodiment. The screenshot 1300 illustrates a chart view 1302 and an editor view 1304.

Figure 14:
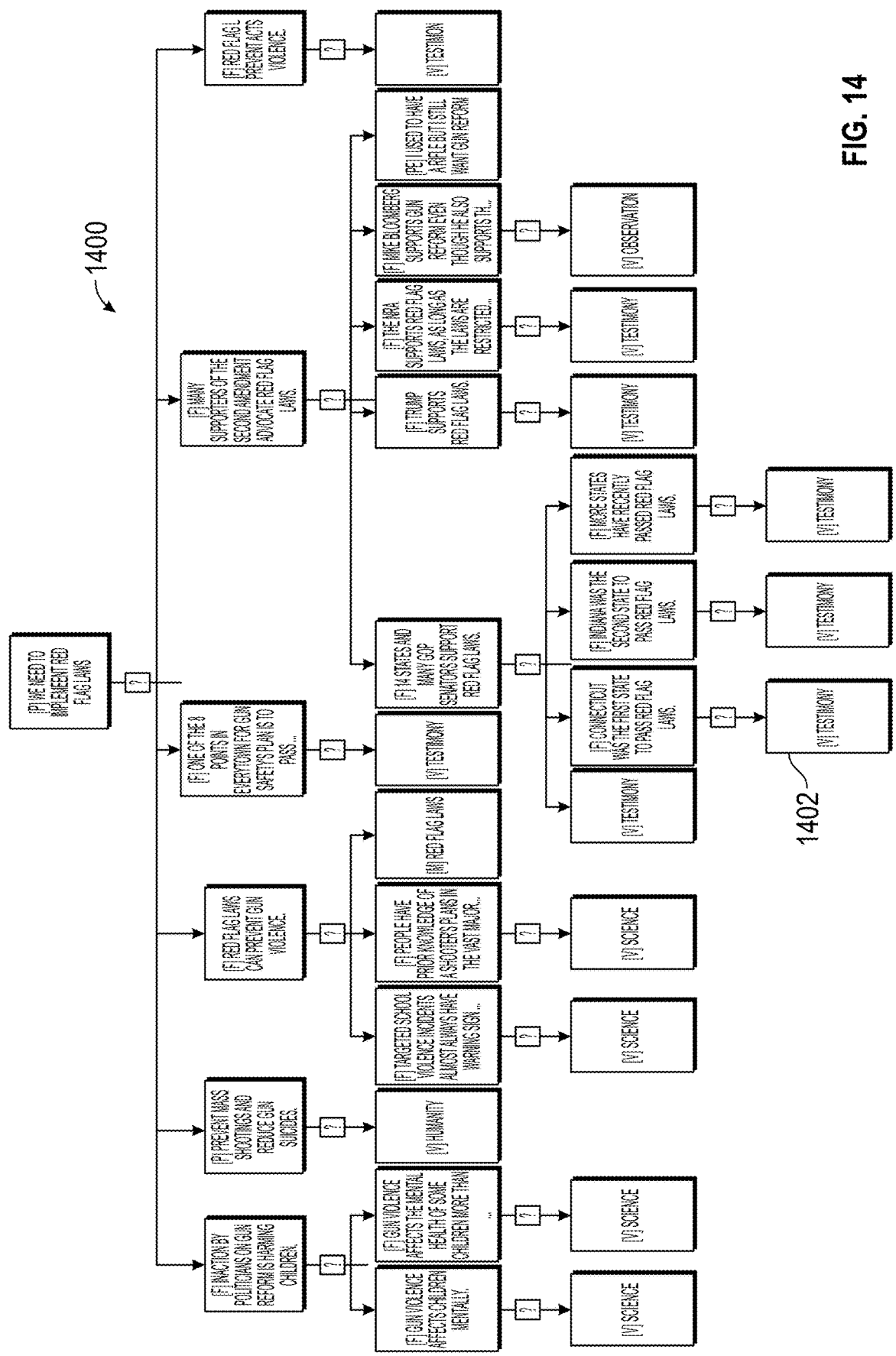
FIG. 14 illustrates a screenshot of a tree structure in accordance with one example embodiment.

FIG. 14 illustrates a screenshot 1400 of the authoring platform system 122 in accordance with one example embodiment. The screenshot 1400 illustrates an example of a tree structure 1402.

Figure 15:
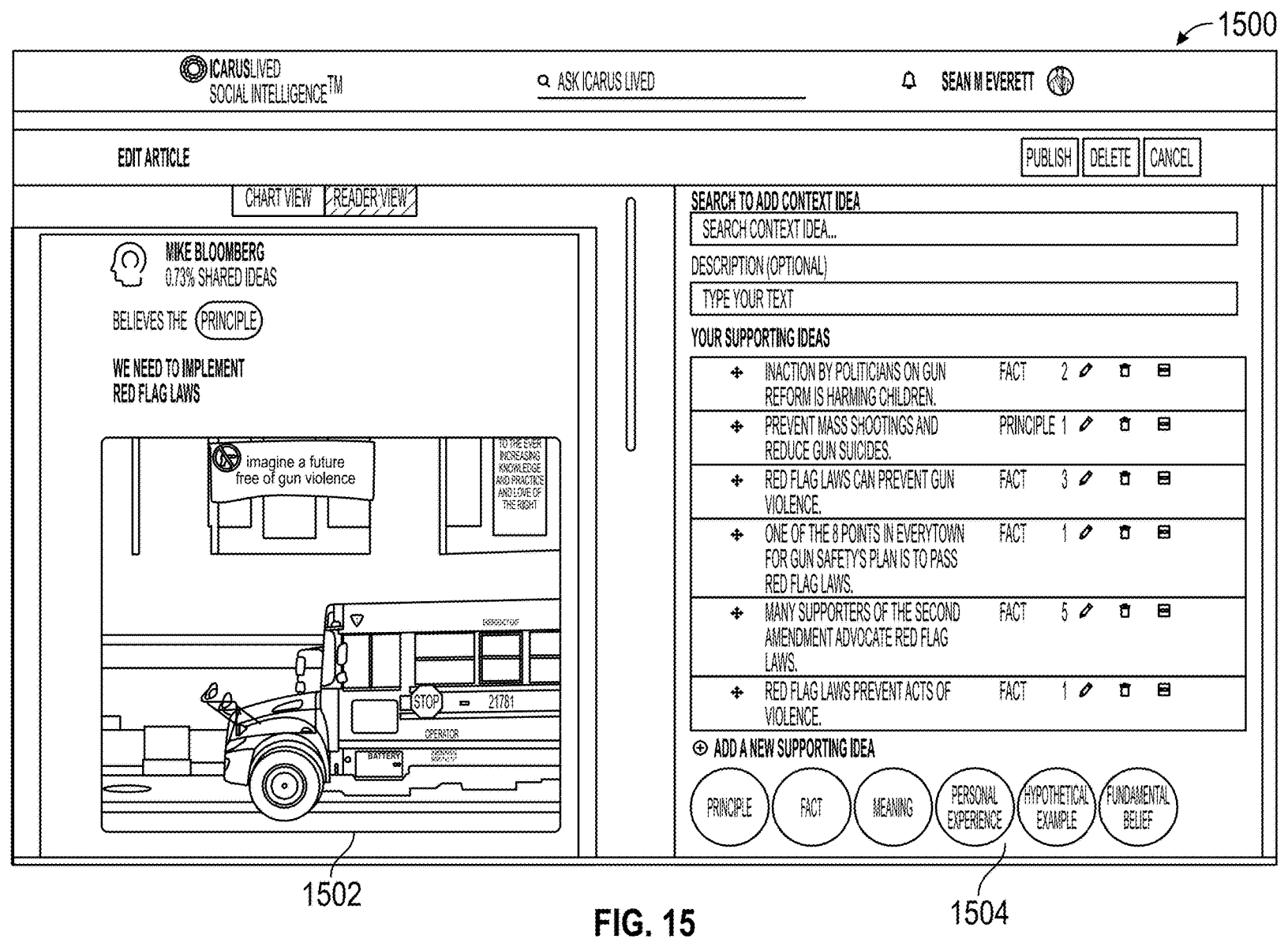

FIG. 15 illustrates a screenshot 1500 of the authoring platform system 122 in accordance with one example embodiment. The screenshot 1500 illustrates a reader view 1502 and an editor view 1504.

Figure 16:
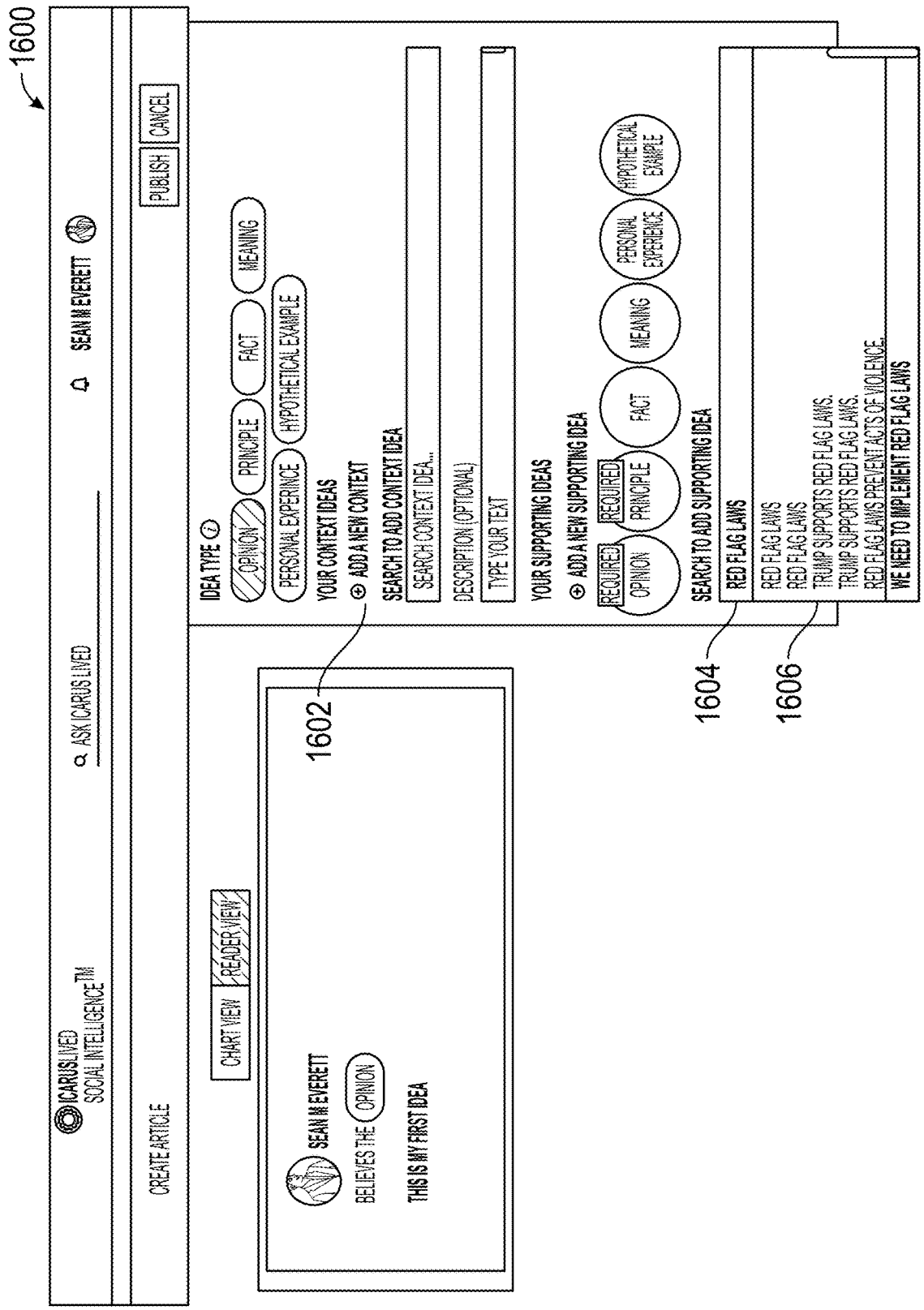
FIG. 16 illustrates a screenshot of an authoring platform system in accordance with one example embodiment.

FIG. 16 illustrates a screenshot 1600 of the authoring platform system 122 in accordance with one example embodiment. The screenshot 1600 illustrates a structured document template 1602. The structured document template 1602 enables the user 130 to input a search term in the search query 1604. The user 130 can then select one of the results from the search results 1606. The selected results will be leveraged and incorporated in a document presently edited by the user 130.

Figure 17:
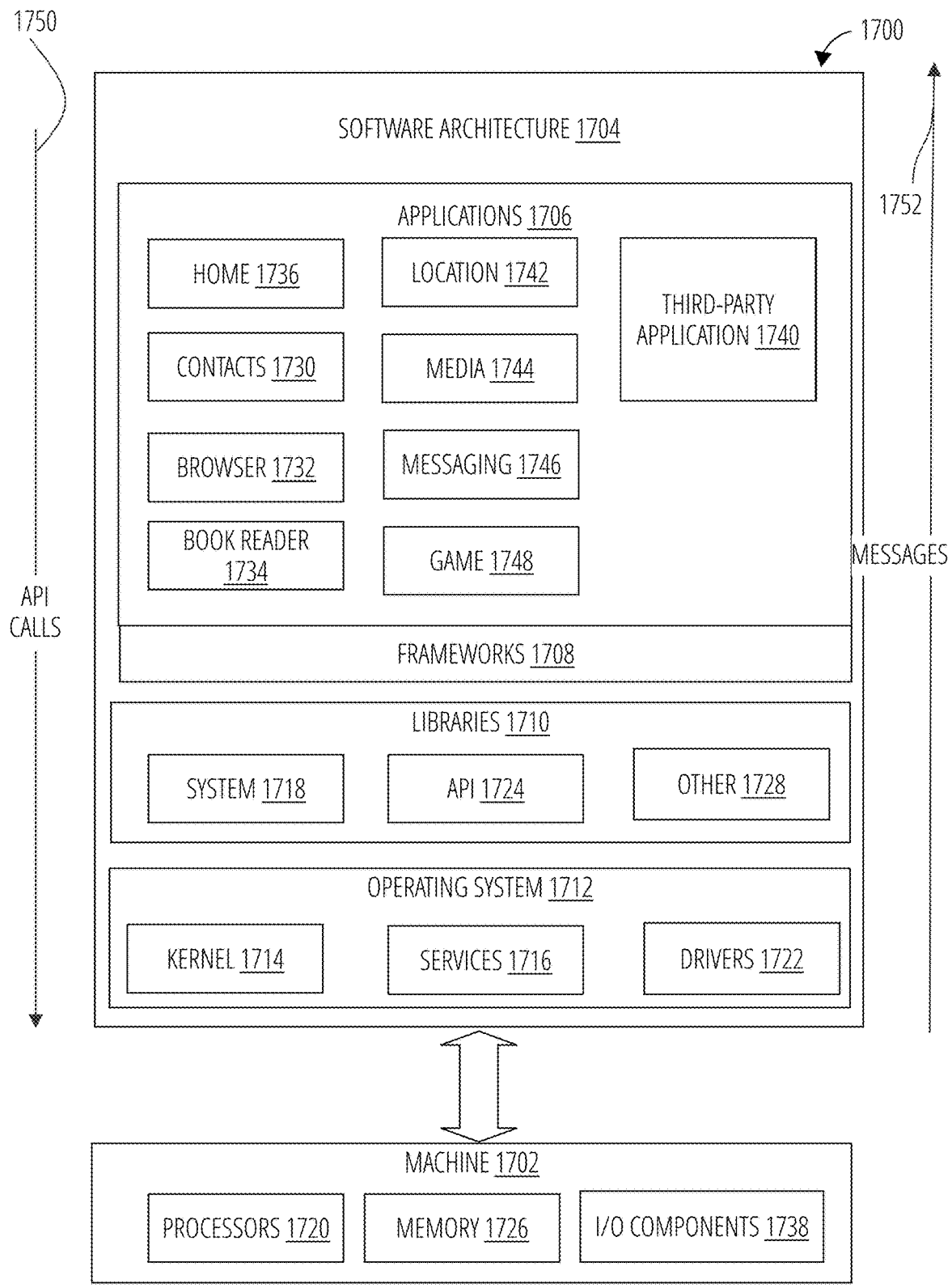
FIG. 17 is block diagram showing a software architecture within which the present disclosure may be implemented, according to an example embodiment.

FIG. 17 is a block diagram 1700 illustrating a software architecture 1704, which can be installed on any one or more of the devices described herein. The software architecture 1704 is supported by hardware such as a machine 1702 that includes processors 1720, memory 1726, and I/O components 1738. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1750 through the software stack and receive messages 1752 in response to the API calls 1750.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, processor management (e.g., scheduling), component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1710 provide a low-level common infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL® framework used to render in two dimensions (2D) and three dimensions (3D) in a graphic content on a display), database libraries (e.g., SQLite® to provide various relational database functions), web libraries (e.g., WebKit® to provide web browsing functionality), and the like. The libraries 1710 can also include a wide variety of other libraries 1728 to provide many other APIs to the applications 1706.

The frameworks 1708 provide a high-level common infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example embodiment, the applications 1706 may include a home application 1736, a contacts application 1730, a browser application 1732, a book reader application 1734, a location application 1742, a media application 1744, a messaging application 1746, a game application 1748, and a broad assortment of other applications such as a third-party application 1740. The applications 1706 are programs that execute functions defined in the programs. Various programming languages can be employed to create one or more of the applications 1706, structured in a variety of manners, such as object-oriented programming languages (e.g., Javascript®, Python®, Objective-C, Java®, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1750 provided by the operating system 1712 to facilitate functionality described herein.

Figure 18:
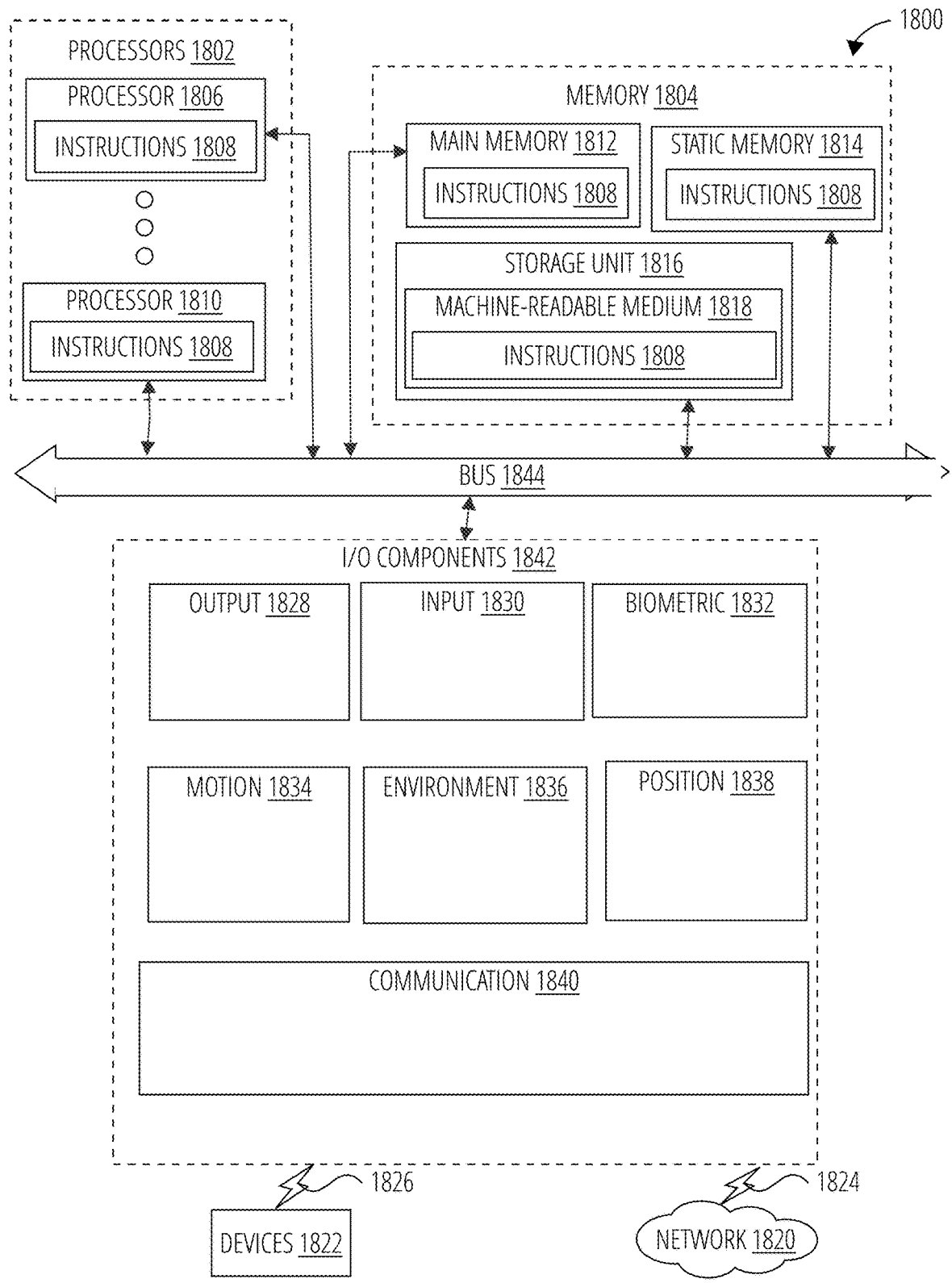
FIG. 18 is a diagrammatic representation of a machine in the form of a computer system within which a set of instructions may be executed for causing the machine to perform any one or more of the methodologies discussed herein, according to an example embodiment.

FIG. 18 is a diagrammatic representation of the machine 1800 within which instructions 1808 (e.g., software, a program, an application, an applet, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein.

The machine 1800 may include processors 1802, memory 1804, and I/O components 1842, which may be configured to communicate with each other via a bus 1844. In an example embodiment, the processors 1802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1806 and a processor 1810 that execute the instructions 1808. The term "processor" is intended to include multi-core processors that may comprise two or more independent processors (sometimes referred to as "cores") that may execute instructions contemporaneously. Although FIG. 18 shows multiple processors 1802, the machine 1800 may include a single processor with a single core, a single processor with multiple cores (e.g., a multi-core processor), multiple processors with a single core, multiple processors with multiples cores, or any combination thereof.

The memory 1804 includes a main memory 1812, a static memory 1814, and a storage unit 1816, both accessible to the processors 1802 via the bus 1844. The main memory 1804, the static memory 1814, and storage unit 1816 store the instructions 1808 embodying any one or more of the methodologies or functions described herein. The instructions 1808 may also reside, completely or partially, within the main memory 1812, within the static memory 1814, within machine-readable medium 1818 within the storage unit 1816, within at least one of the processors 1802 (e.g., within the processor's cache memory), or any suitable combination thereof, during execution thereof by the machine 1800.

The I/O components 1842 may include a wide variety of components to receive input, provide output, produce output, transmit information, exchange information, capture measurements, and so on. The specific I/O components 1842 that are included in a particular machine will depend on the type of machine. For example, portable machines such as mobile phones may include a touch input device or other such input mechanisms, while a headless server machine will likely not include such a touch input device. It will be appreciated that the I/O components 1842 may include many other components that are not shown in FIG. 18. In various example embodiments, the I/O components 1842 may include output components 1828 and input components 1830. The output components 1828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1842 may include biometric components 1832, motion components 1834, environmental components 1836, or position components 1838, among a wide array of other components. For example, the biometric components 1832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1834 include acceleration sensor components (e.g., accelerometer), gravitation sensor components, rotation sensor components (e.g., gyroscope), and so forth. The environmental components 1836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1838 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1842 further include communication components 1840 operable to couple the machine 1800 to a network 1820 or devices 1822 via a coupling 1824 and a coupling 1826, respectively. For example, the communication components 1840 may include a network interface component or another suitable device to interface with the network 1820. In further examples, the communication components 1840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1822 may be another machine or any of a wide variety of peripheral devices (e.g., a peripheral device coupled via a USB).

Moreover, the communication components 1840 may detect identifiers or include components operable to detect identifiers. For example, the communication components 1840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1840, such as location via Internet Protocol (IP) geolocation, location via Wi-Fi® signal triangulation, location via detecting an NFC beacon signal that may indicate a particular location, and so forth.

The various memories (e.g., memory 1804, main memory 1812, static memory 1814, and/or memory of the processors 1802) and/or storage unit 1816 may store one or more sets of instructions and data structures (e.g., software) embodying or used by any one or more of the methodologies or functions described herein. These instructions (e.g., the instructions 1808), when executed by processors 1802, cause various operations to implement the disclosed embodiments.

The instructions 1808 may be transmitted or received over the network 1820, using a transmission medium, via a network interface device (e.g., a network interface component included in the communication components 1840) and using any one of a number of well-known transfer protocols (e.g., hypertext transfer protocol (HTTP)). Similarly, the instructions 1808 may be transmitted or received using a transmission medium via the coupling 1826 (e.g., a peer-to-peer coupling) to the devices 1822.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Examples

Example 1 is a computer-implemented method comprising: receiving a user-selected idea type attribute of a structured document template; identifying a supporting idea type attribute based on the user-selected idea type attribute and taxonomy rules for the structured document template; receiving a user-selected supporting idea type attribute and content of the user-selected supporting idea type attribute; forming a tree structure of the structured document template based on the user-selected idea type attribute, the user-selected supporting idea type attribute, and the content of the user-selected supporting idea type attribute; and generating a document based on the tree structure.

Example 2 includes example 1, wherein identifying the supporting idea type attribute further comprises: indicating that the supporting idea type attribute is required based on the user-selected idea type attribute and the taxonomy rules.

Example 3 includes any of the above examples, further comprising: presenting a plurality of supporting idea type attributes of the structured document template; receiving the user-selected supporting idea type attribute selected from the plurality of supporting idea type attributes; and validating the tree structure of the document based on the user-selected idea type attribute and the content of the user-selected supporting idea type attribute.

Example 4 includes any of the above examples, further comprising: receiving a keyword search query related to the content of the user-selected supporting idea type attribute; providing one or more keywords in response to receiving the keyword search query; receiving a selected keyword from the one more keywords; and adding the selected keyword to a keyword attribute for the user-selected supporting idea type attribute.

Example 5 includes any of the above examples, further comprising: receiving a content search query related to the content of the user-selected supporting idea type attribute; and providing a search result in response to receiving the content search query, the search result comprising existing content related to the user-selected supporting idea type attribute, the existing content being based on previously generated documents using the structured document template.

Example 6 includes any of the above examples, further comprising: receiving user-selected existing content from the search result; and adding the user-selected existing content to the tree structure.

Example 7 includes any of the above examples, further comprising: receiving user-selected existing content from the search result; and tagging the user-selected existing content from the search result with a keyword from the content search query as search result metadata, the search result metadata associating the keyword with the user-selected existing content.

Example 8 includes any of the above examples, further comprising: forming a graphical user interface that is configured to allow content to be edited in a form that resembles its appearance when published; receiving an input in the graphical user interface, the input indicating a change in the content; validating the change based on the taxonomy rules; in response to the validating, updating the tree structure based on the change; and updating the document based on the updated tree structure.

Example 9 includes any of the above examples, further comprising: forming a graphical user interface comprising a first pane, a second pane, and a third pane, the first pane comprising a chart view illustrating the tree structure, the second pane comprising a reader view illustrating the document, the third pane comprising an authoring view illustrating the structured document template; causing a display of at least two panes of the graphical user interface; receiving an input in the chart view, the input indicating a change in the tree structure; validating the change based on the taxonomy rules; in response to the validating, updating the tree structure based on the change; and updating the document based on the updated tree structure.

Example 10 includes any of the above examples, wherein the taxonomy rules comprise content rules that map the supporting idea type attribute to the idea type attribute, wherein the value of the idea type attribute comprises one of a content, a belief system, an opinion, a principle, a fact, a meaning, a personal experience, or a hypothetical example, and wherein the value of the supporting idea type attribute comprises one of an opinion, a principle, a fact, a meaning, a personal experience, a hypothetical example, or a fundamental belief.

Example 11 is a computing apparatus comprising: a Processor; and a memory storing instructions that, when executed by the Processor, configure the apparatus to perform operations comprising: receive a user-selected idea type attribute of a structured document template; identify a supporting idea type attribute based on the user-selected idea type attribute and taxonomy rules for the structured document template; receive a user-selected supporting idea type attribute and content of the user-selected supporting idea type attribute; form a tree structure of the structured document template based on the user-selected idea type attribute, the user-selected supporting idea type attribute, and the content of the user-selected supporting idea type attribute; and generate a document based on the tree structure.

Example 12 includes any of the above examples, wherein identifying the supporting idea type attribute further comprises: indicate that the supporting idea type attribute is required based on the user-selected idea type attribute and the taxonomy rules.

Example 13 includes any of the above examples, wherein the instructions further configure the apparatus to: present a plurality of supporting idea type attributes of the structured document template; receive the user-selected supporting idea type attribute selected from the plurality of supporting idea type attributes; and validate the tree structure of the document based on the user-selected idea type attribute and the content of the user-selected supporting idea type attribute.

Example 14 includes any of the above examples, wherein the instructions further configure the apparatus to: receive a keyword search query related to the content of the user-selected supporting idea type attribute; and provide one or more keywords in response to receiving the keyword search query; receive a selected keyword from the one more keywords; and add the selected keyword to a keyword attribute for the user-selected supporting idea type attribute.

Example 15 includes any of the above examples, wherein the instructions further configure the apparatus to: receive a content search query related to the content of the user-selected supporting idea type attribute; and provide a search result in response to receiving the content search query, the search result comprising existing content related to the user-selected supporting idea type attribute, the existing content being based on previously generated documents using the structured document template.

Example 16 includes any of the above examples, wherein the instructions further configure the apparatus to: receive user-selected existing content from the search result; and add the user-selected existing content to the tree structure.

Example 17 includes any of the above examples, wherein the instructions further configure the apparatus to: receive user-selected existing content from the search result; and tag the user-selected existing content from the search result with a keyword from the content search query as search result metadata, the search result metadata associating the keyword with the user-selected existing content.

Example 18 includes any of the above examples, wherein the instructions further configure the apparatus to: form a graphical user interface that is configured to allow content to be edited in a form that resembles its appearance when published; receive an input in the graphical user interface, the input indicating a change in the content; validate the change based on the taxonomy rules; in response to the validating, update the tree structure based on the change; and update the document based on the updated tree structure.

Example 19 includes any of the above examples, wherein the instructions further configure the apparatus to: form a graphical user interface comprising a first pane, a second pane, and a third pane, the first pane comprising a chart view illustrating the tree structure, the second pane comprising a reader view illustrating the document, the third pane comprising an authoring view illustrating the structured document template; cause a display of at least two panes of the graphical user interface; receive an input in the chart view, the input indicating a change in the tree structure; validate the change based on the taxonomy rules; in response to the validating, update the tree structure based on the change; and update the document based on the updated tree structure.

Example 20 is a non-transitory computer-readable storage medium, the computer-readable storage medium including instructions that when executed by a computer, cause the computer to perform operations comprising: receive a user-selected idea type attribute of a structured document template; identify a supporting idea type attribute based on the user-selected idea type attribute and taxonomy rules for the structured document template; receive a user-selected supporting idea type attribute and content of the user-selected supporting idea type attribute; form a tree structure of the structured document template based on the user-selected idea type attribute, the user-selected supporting idea type attribute, and the content of the user-selected supporting idea type attribute; and generate a document based on the tree structure.

What is claimed is:

1. A computer-implemented method comprising:
   receiving, from a client device, a user-selected idea type attribute of a structured document template;
   identifying a supporting idea type attribute based on the user-selected idea type attribute and taxonomy rules for the structured document template;
   receiving a user-selected supporting idea type attribute and content of the user-selected supporting idea type attribute;
   forming a tree structure of the structured document template based on the user-selected idea type attribute, the user-selected supporting idea type attribute, and the content of the user-selected supporting idea type attribute;
   generating a document based on the tree structure;
   displaying the document at the client device prior to publishing the document, the document including an identification of an author of the document, an identification of the user-selected idea type attribute of the document, and a metric indicating a percentage of shared ideas, the document displaying that the author of the document believes the user-selected idea type attribute of the document;
   detecting a publication request from the client device;
   in response to detecting the publication request, publishing the document with a social network application;
   receiving, from the client device, a content search query related to the content of the user-selected supporting idea type attribute;
   providing, to the client device, a search result in response to receiving the content search query, the search result comprising a plurality of existing content related to the user-selected supporting idea type attribute, and a corresponding supporting idea type attribute, the existing content being based on previously generated documents using the structured document template;
   receiving, from the client device, a selection of one of the plurality of existing content from the search result;
   identifying a user-selected existing content based on receiving, from the client device, the selection of one of the plurality of existing content from the search result; and
   in response to receiving the selection of the one of the plurality of existing content from the search result, incorporating the user-selected existing content and the corresponding supporting idea type attribute in the tree structure of the document.

2. The computer-implemented method of claim 1, wherein identifying the supporting idea type attribute further comprises:
   indicating that the supporting idea type attribute is required based on the user-selected idea type attribute and the taxonomy rules.

3. The computer-implemented method of claim 1, further comprising:
   presenting a plurality of supporting idea type attributes of the structured document template;
   receiving the user-selected supporting idea type attribute selected from the plurality of supporting idea type attributes; and
   validating the tree structure of the document based on the user-selected idea type attribute and the content of the user-selected supporting idea type attribute.

4. The computer-implemented method of claim 1, further comprising:
   receiving a keyword search query related to the content of the user-selected supporting idea type attribute;
   providing one or more keywords in response to receiving the keyword search query;
   receiving a selected keyword from the one more keywords; and
   adding the selected keyword to a keyword attribute for the user-selected supporting idea type attribute.

5. The computer-implemented method of claim 1, further comprising:
   receiving user-selected existing content from the search result; and tagging the user-selected existing content from the search result with a keyword from the content search query as search result metadata, the search result metadata associating the keyword with the user-selected existing content.

6. The computer-implemented method of claim 1, further comprising:
forming a graphical user interface that is configured to allow content to be edited in a published format;
receiving an input in the graphical user interface, the input indicating a change to at least one of the user-selected idea type attribute, the user-selected supporting idea type attribute, and the content of the user-selected supporting idea type attribute;
validating the change based on the taxonomy rules;
in response to the validating, updating the tree structure based on the change; and
updating the document based on the updated tree structure.

7. The computer-implemented method of claim 1, further comprising:
forming a graphical user interface comprising a first pane, and a second pane, the first pane comprising a toggle view interface element that toggles between a chart view and a reader view, the chart view illustrating the tree structure, the reader view illustrating the document generated based on the tree structure, the second pane comprising an authoring view illustrating the structured document template;
causing a display of the graphical user interface at the client device;
receiving an input in the second pane, the input indicating a change to at least one of the user-selected idea type attribute, the user-selected supporting idea type attribute, and the content of the user-selected supporting idea type attribute;
validating the change based on the taxonomy rules;
in response to the validating, updating the tree structure based on the change; and
updating the document based on the updated tree structure.

8. The computer-implemented method of claim 1, wherein the taxonomy rules comprise content rules that map the supporting idea type attribute to the idea type attribute.

9. A computing apparatus, the computing apparatus comprising:
a processor; and
a memory storing instructions that, when executed by the processor, configure the apparatus to perform operations comprising:
receive, from a client device, a user-selected idea type attribute of a structured document template;
identify a supporting idea type attribute based on the user-selected idea type attribute and taxonomy rules for the structured document template;
receive a user-selected supporting idea type attribute and content of the user-selected supporting idea type attribute;
form a tree structure of the structured document template based on the user-selected idea type attribute, the user-selected supporting idea type attribute, and the content of the user-selected supporting idea type attribute;
generate a document based on the tree structure;
display the document at the client device prior to publishing the document, the document including an identification of an author of the document, an identification of the user-selected idea type attribute of the document, and a metric indicating a percentage of shared ideas, the document displaying that the author of the document believes the user-selected idea type attribute of the document;
detect a publication request from the client device;
in response to detecting the publication request, publish the document with a social network application;
receive, from the client device, a content search query related to the content of the user-selected supporting idea type attribute;
provide, to the client device, a search result in response to receiving the content search query, the search result comprising a plurality of existing content related to the user-selected supporting idea type attribute, and a corresponding supporting idea type attribute, the existing content being based on previously generated documents using the structured document template;
receiving, from the client device, a selection of one of the plurality of existing content from the search result;
identify a user-selected existing content based on receiving, from the client device, the selection of one of the plurality of existing content from the search result; and
in response to receiving the selection of the one of the plurality of existing content from the search result, incorporate the user-selected existing content and the corresponding supporting idea type attribute in the tree structure of the document.

10. The computing apparatus of claim 9, wherein identifying the supporting idea type attribute further comprises:
indicate that the supporting idea type attribute is required based on the user-selected idea type attribute and the taxonomy rules.

11. The computing apparatus of claim 9, wherein the instructions further configure the apparatus to:
present a plurality of supporting idea type attributes of the structured document template;
receive the user-selected supporting idea type attribute selected from the plurality of supporting idea type attributes; and
validate the tree structure of the document based on the user-selected idea type attribute and the content of the user-selected supporting idea type attribute.

12. The computing apparatus of claim 9, wherein the instructions further configure the apparatus to:
receive a keyword search query related to the content of the user-selected supporting idea type attribute;
provide one or more keywords in response to receiving the keyword search query;
receive a selected keyword from the one more keywords; and
add the selected keyword to a keyword attribute for the user-selected supporting idea type attribute.

13. The computing apparatus of claim 9, wherein the instructions further configure the apparatus to:
receive user-selected existing content from the search result; and
tag the user-selected existing content from the search result with a keyword from the content search query as search result metadata, the search result metadata associating the keyword with the user-selected existing content.

14. The computing apparatus of claim 9, wherein the instructions further configure the apparatus to:

form a graphical user interface that is configured to allow content to be edited in a published format;

receive an input in the graphical user interface, the input indicating a change to at least one of the user-selected idea type attribute, the user-selected supporting idea type attribute, and the content of the user-selected supporting idea type attribute;

validate the change based on the taxonomy rules;

in response to the validating, update the tree structure based on the change; and update the document based on the updated tree structure.

15. The computing apparatus of claim 9, wherein the instructions further configure the apparatus to:

form a graphical user interface comprising a first pane, and a second pane, the first pane comprising a toggle view interface element that toggles between a chart view and a reader view, the chart view illustrating the tree structure, the view illustrating the document generated based on the tree structure, the pane comprising an authoring view illustrating the structured document template;

cause a display of the graphical user interface at the client device;

receive an input in the second pane, the input indicating a change to at least one of the user-selected idea type attribute, the user-selected supporting idea type attribute, and the content of the user-selected supporting idea type attribute;

validate the change based on the taxonomy rules;

in response to the validating, update the tree structure based on the change; and update the document based on the updated tree structure.

16. A non-transitory computer-readable storage medium, the computer-readable storage medium including instructions that when executed by a computer, cause the computer to perform operations comprising:

receive, from a client device, a user-selected idea type attribute of a structured document template;

identify a supporting idea type attribute based on the user-selected idea type attribute and taxonomy rules for the structured document template;

receive a user-selected supporting idea type attribute and content of the user-selected supporting idea type attribute;

form a tree structure of the structured document template based on the user-selected idea type attribute, the user-selected supporting idea type attribute, and the content of the user-selected supporting idea type attribute;

generate a document based on the tree structure;

display the document at the client device prior to publishing the document, the document including an identification of an author of the document, an identification of the user-selected idea type attribute of the document, and a metric indicating a percentage of shared ideas, the document displaying that the author of the document believes the user-selected idea type attribute of the document;

detect a publication request from the client device;

in response to detecting the publication request, publish the document with a social network application;

receive, from the client device, a content search query related to the content of the user-selected supporting idea type attribute;

provide, to the client device, a search result in response to receiving the content search query, the search result comprising a plurality of existing content related to the user-selected supporting idea type attribute, and a corresponding supporting idea type attribute, the existing content being based on previously generated documents using the structured document template;

receiving, from the client device, a selection of one of the plurality of existing content from the search result;

identify a user-selected existing content based on receiving, from the client device, the selection of one of the plurality of existing content from the search result; and in response to receiving the selection of the one of the plurality of existing content from the search result, incorporate the user-selected existing content and the corresponding supporting idea type attribute in the tree structure of the document.

\* \* \* \* \*